(12) United States Patent
Liu et al.

(10) Patent No.: US 7,604,188 B2
(45) Date of Patent: Oct. 20, 2009

(54) AUTOMATIC COMPACT DISK FEEDING APPARATUS

(75) Inventors: Ming-Hsun Liu, 3F, No. 8, Lane 143, Xinming Rd., Neihu District, Taipei (TW) 11471; Zong-Wei Dong, Taipei (TW)

(73) Assignee: Ming-Hsun Liu, Taipei (TW)

( * ) Notice: Subject to any disclaimer, the term of this patent is extended or adjusted under 35 U.S.C. 154(b) by 386 days.

(21) Appl. No.: 11/671,855

(22) Filed: Feb. 6, 2007

(65) Prior Publication Data

US 2007/0182769 A1    Aug. 9, 2007

(30) Foreign Application Priority Data

Feb. 8, 2006    (TW) .............................. 95104146 A

(51) Int. Cl.
*B02C 23/00*    (2006.01)
*B02C 23/02*    (2006.01)

(52) U.S. Cl. ...................................... 241/100; 241/222

(58) Field of Classification Search ................. 241/100, 241/222, 236, 34, 225, 285.1
See application file for complete search history.

(56) References Cited

U.S. PATENT DOCUMENTS

| 4,815,670 A * | 3/1989 | Iwai .............................. 241/34 |
| 6,490,232 B2 * | 12/2002 | Sato ......................... 369/30.34 |
| 2007/0057099 A1 * | 3/2007 | Kubo et al. .............. 241/101.2 |

* cited by examiner

*Primary Examiner*—Faye Francis
(74) *Attorney, Agent, or Firm*—Pai Patent & Trademark Law Firm; Chao-Chang David Pai

(57) ABSTRACT

A compact disk feeder includes a base assembly, a disk transportation device and a disk holder. The base assembly includes a casing with a slot. The disk transportation device is mounted in the base assembly and includes a feeding roller rotatably mounted in the casing and partially exposed on the casing. The disk holder demountably is mounted on the base assembly to hold a compact disk stack. Thus, the rotated feeding tray moves the compact disk at the bottom of the compact disk stack through the slot to a new location, such as a tray of a burner or a disk destroying apparatus.

19 Claims, 7 Drawing Sheets

AUTOMATIC COMPACT DISK FEEDING APPARATUS

RELATED APPLICATIONS

The present application is based on, and claims priority from, Taiwan Application Serial Number 95104146, filed Feb. 08, 2006, the disclosure of which is hereby incorporated by reference herein in its entirety.

BACKGROUND

1. Field of the Invention

The present invention relates to a compact disk feeder. More particularly, the present invention relates to an automatic compact disk feeder that delivers the bottom of a compact disk stack to a new location, such as a disk destroying apparatus, a disk drive or a burner.

2. Description of Related Art

Optical disks, or so-called compact disks (CDs), contain digital data such as music, text, video, computer programs, etc. that can be read out or written in by laser beams. Optical disks have been extensively used as a medium to store or replicate the aforementioned digital data.

Generally, burners are used to replicate disks when only several or tens of disk copies are needed for home users or small business users. Programmable self-operating compact disk duplication systems or automatic compact disk duplication systems have been developed to help users duplicate a small amount of compact disks. Those duplication systems need an automatic and efficient disk feeder.

In addition, compact disks may contain data that have secret, private or confidential data stored on them. Those disks cannot be arbitrarily thrown away and may have to be destroyed before they are thrown away. Likewise, automatic destroying apparatus for compact disks also need an automatic and efficient disk feeder.

Therefore, there is a need to provide an improved automatic compact disk feeder to mitigate or obviate the aforementioned problems.

SUMMARY

A compact disk feeder comprises a base assembly, a disk transportation device and a disk holder. The base assembly comprises a casing with a slot. The disk transportation device is mounted in the base assembly and comprises a feeding roller rotatably mounted in the casing and partially exposed on the casing. The disk holder is demountably mounted on the base assembly to hold a stack of compact disks. Thus, the rotational feeding roller moves the compact disk at the bottom of the compact disk stack through the slot to a new location, such as the tray of a burner or a disk destroying apparatus.

In an embodiment of an automatic compact disk feeding apparatus in accordance with the present invention, the feeding apparatus includes a base assembly, a disk transportation device and a disk holder. The base assembly includes a casing. The casing includes a top recess and a disk outlet. The top recess has an inclined bottom, a slot defined in a bottom edge of the inclined bottom and a platform formed on the inclined bottom. The platform has a top surface aligned with the slot. The disk transportation device is mounted in the base assembly and includes a feeding roller rotatably mounted in the casing and partially exposed on the inclined bottom. The disk holder is demountably mounted on the base assembly to hold a stack of compact disks, and has an opening aligned with the slot when the disk holder is mounted on the casing. The feeding roller moves the compact disk at the bottom of the compact disk stack through the slot and the disk outlet when the feeding roller is rotated.

The automatic compact disk feeding apparatus delivers the compact disk at the bottom of the compact disk stack to a new location, such as a disk destroying apparatus, a disk drive or a burner. The automatic compact disk feeding apparatus is compatible with various applications and is compact so as to be integrated in the applied device.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
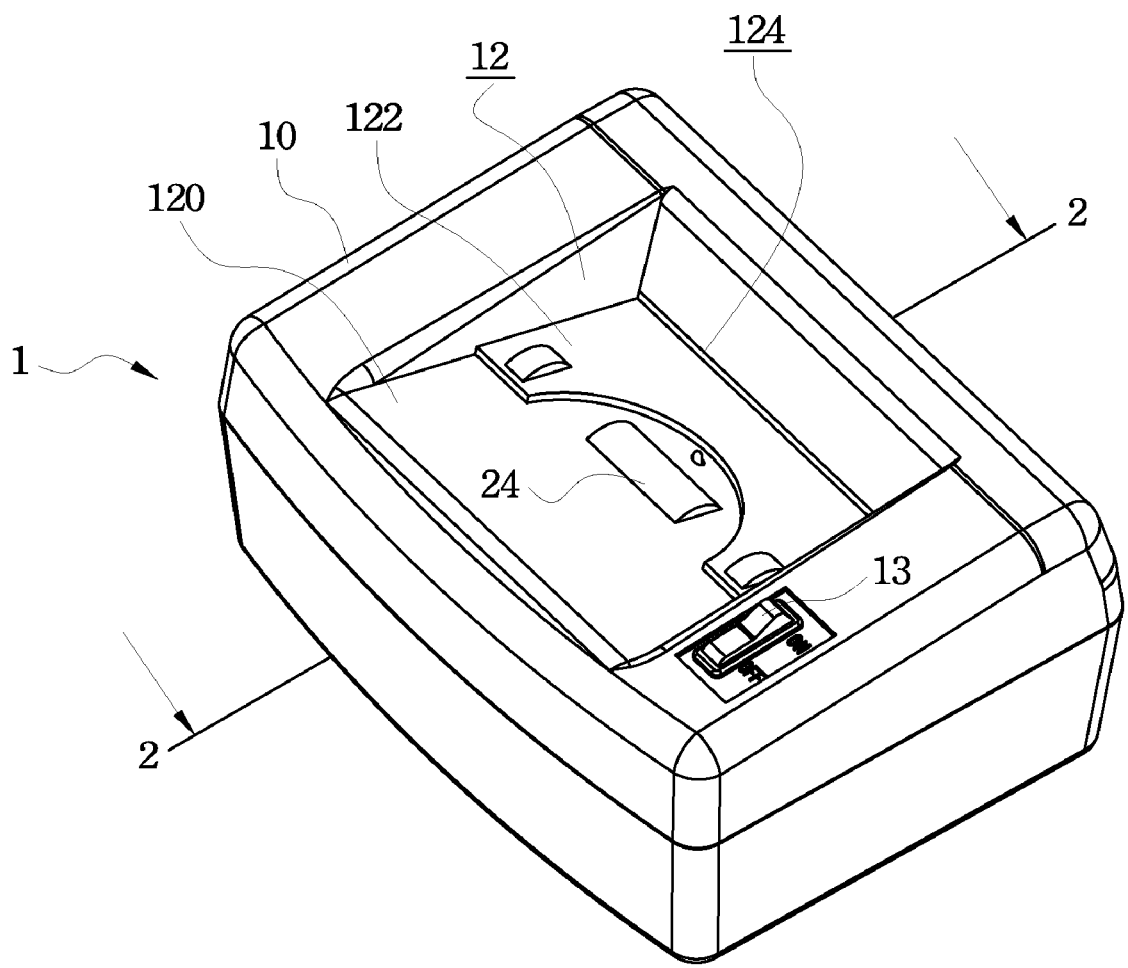
FIG. 1 is a perspective view of an embodiment of a disk destroying apparatus with an automatic compact disk feeding apparatus in accordance with the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
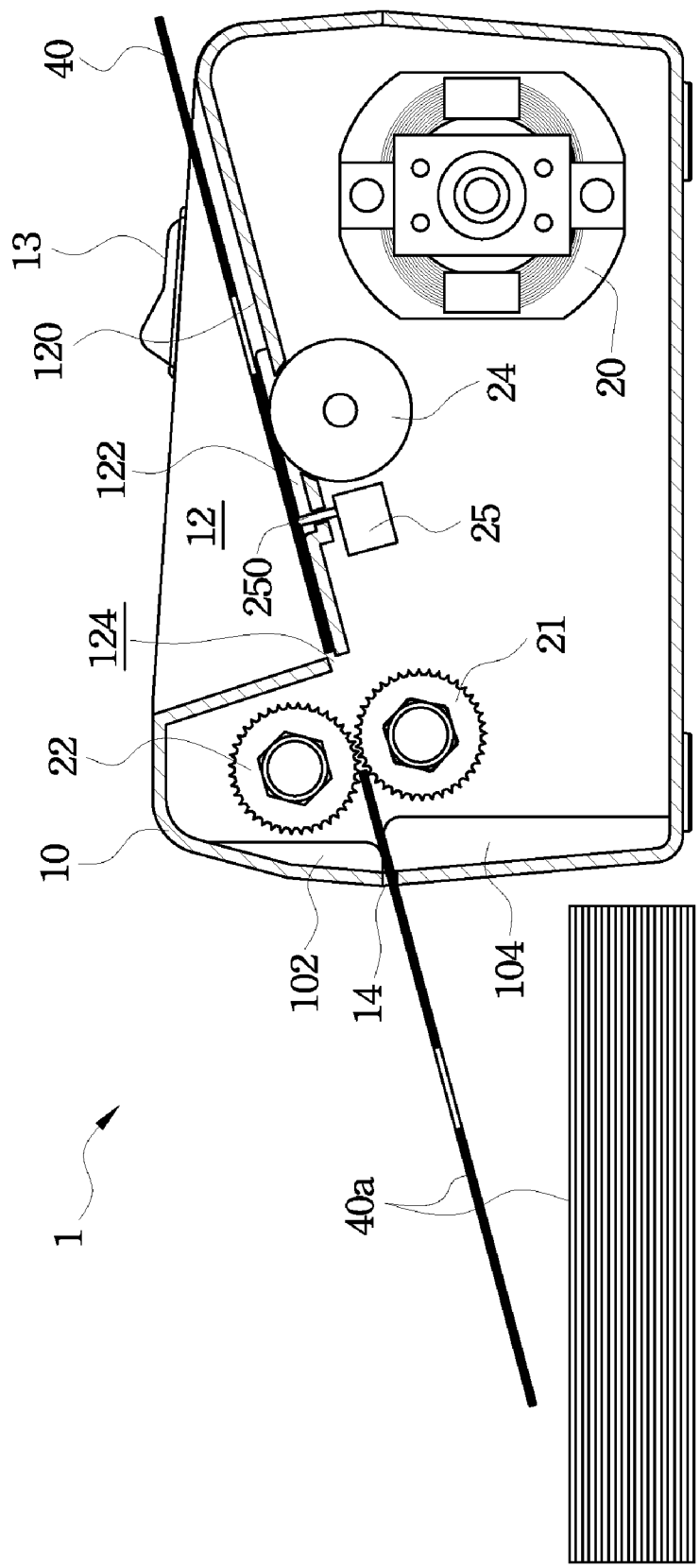
FIG. 2 is a sectional view of the disk destroying apparatus along line 2-2 in FIG. 1.
Figure 3:
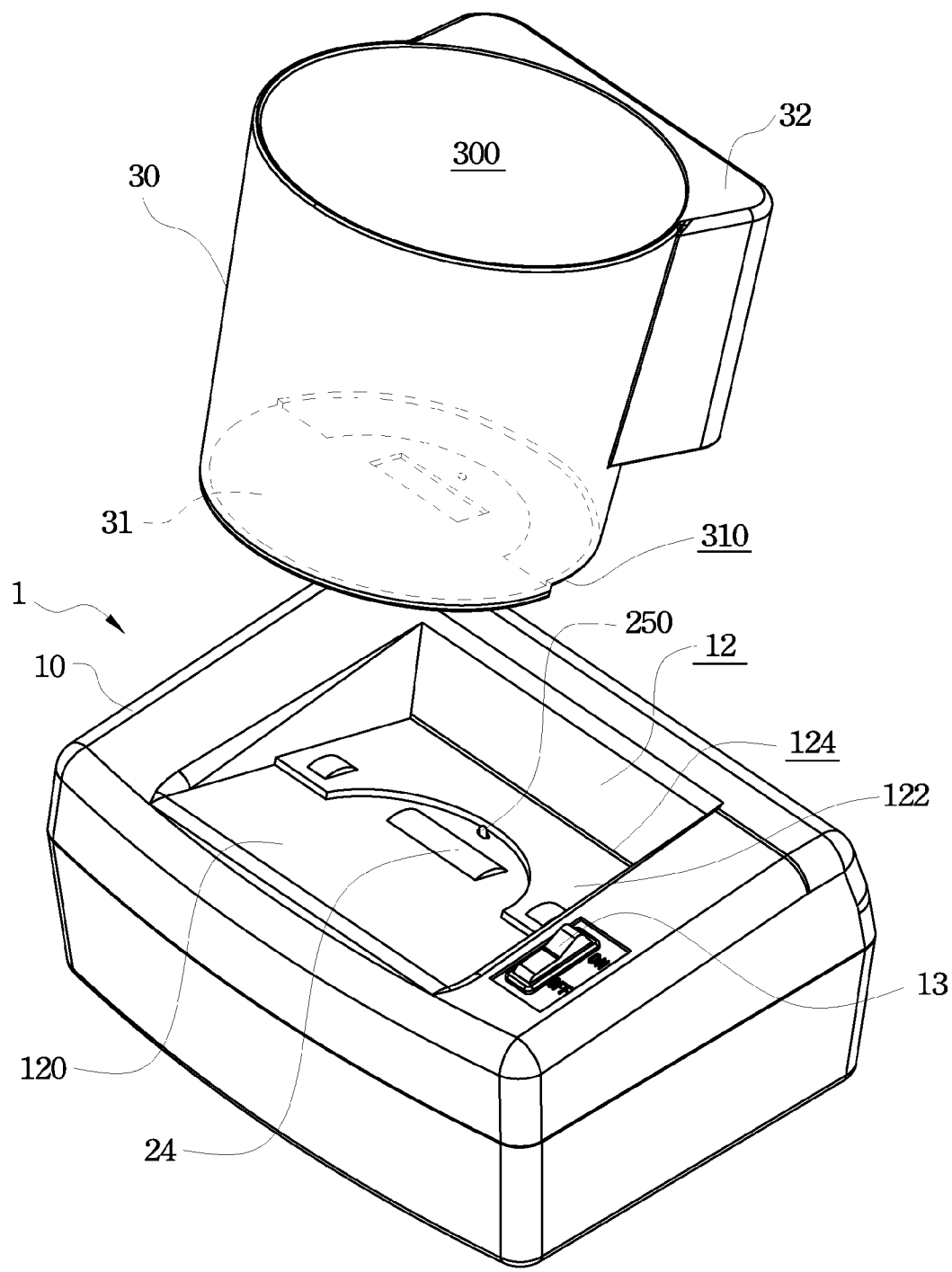
FIG. 3 is an exploded perspective view of the disk destroying apparatus with a disk holder.

Refer to FIG. 1, FIG. 2 and FIG. 3. An embodiment of an automatic compact disk feeding apparatus 1 in accordance with the present invention comprises a base assembly 10, a disk transportation device and a disk holder 30. The disk transportation device is mounted in the base assembly 10 to deliver a compact disk 40 onto a tray of a disk drive or to a disk destroying apparatus. The disk holder 30 is mounted on the base assembly 10 and holds a stack of compact disks 40 where the compact disk at the bottom of the compact disk stack 40 is conveyed by the disk transportation device.

Figure 4:
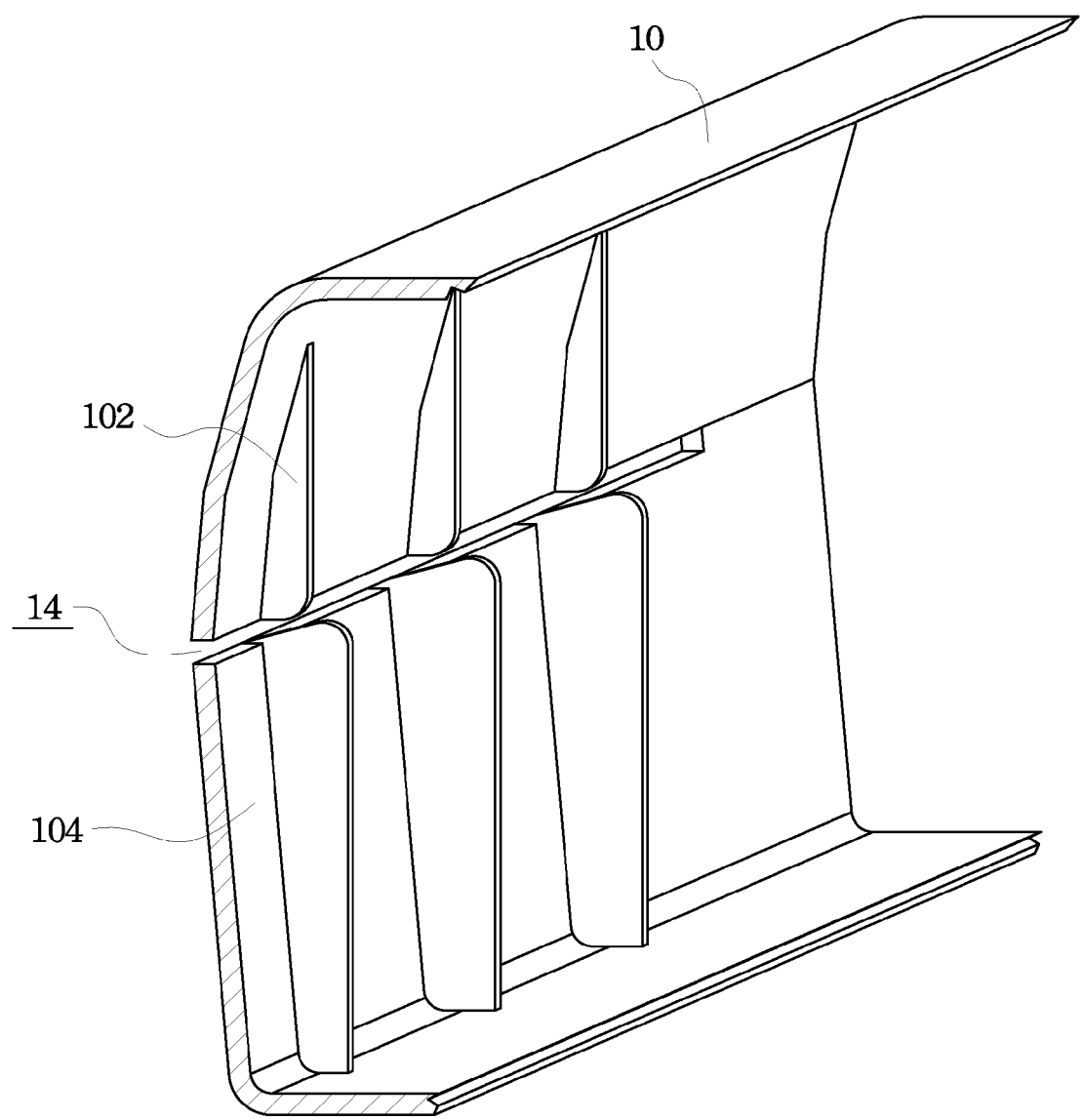
FIG. 4 is a sectional view of a portion of a casing of the disk feeding apparatus.

Further refer to FIG. 4. The base assembly 10 comprises a casing, a power switch 13 and multiple guide fins 102,104. The casing has a top recess 12 and a disk outlet 14. The top recess 12 has an inclined bottom 120, a slot 124 defined in the bottom edge of the inclined bottom 120 and a platform 122 formed on the inclined bottom 120. The platform 122 has a semicircular recess and a top surface. The top surface is aligned with the slot 124. The power switch 13 is mounted on the casing. The guide fins 102, 104 are mounted inside the casing and are perpendicular to the disk outlet 14.

The disk transportation device comprises a motor 20, a feeding roller 24 and a touching switch 25. The motor 20 is electrically connected to the power switch 13 so that the motor 20 starts to rotate as the power switch 13 is turned on and the touching switch 25 is triggered. The feeding roller 24 is rotatably mounted in the casing, rotated by the motor 20 and is partially exposed to the outside of the casing at the semicircular recess of the disk platform 12. The touching switch 25 is mounted in the casing and comprises a trigger 250 that extends out of the inclined bottom 120 of the top recess.

The disk holder 30 is demountably mounted on the disk platform 122 and the inclined bottom 120 and comprises an inner space 300, a handle 32 and a bottom 31. The bottom 31 has an opening 310 aligned with the slot 124 when the disk holder 30 is mounted on the casing. The inner space 300 may hold a stack of compact disks 40 in position. Therefore, when the power switch 13 is turned on and the disk holder 30 holds the compact disks 40, the disks 40 press against the trigger 250 of the touching switch 25 so that the motor 20 rotates the feeding roller 24. Rotations of the feeding roller 24 move the bottom of the stack of compact disk 40 by friction at a given speed. The moved disk 40 passes through the slot 124 and the disk outlet 14.

Figure 5:
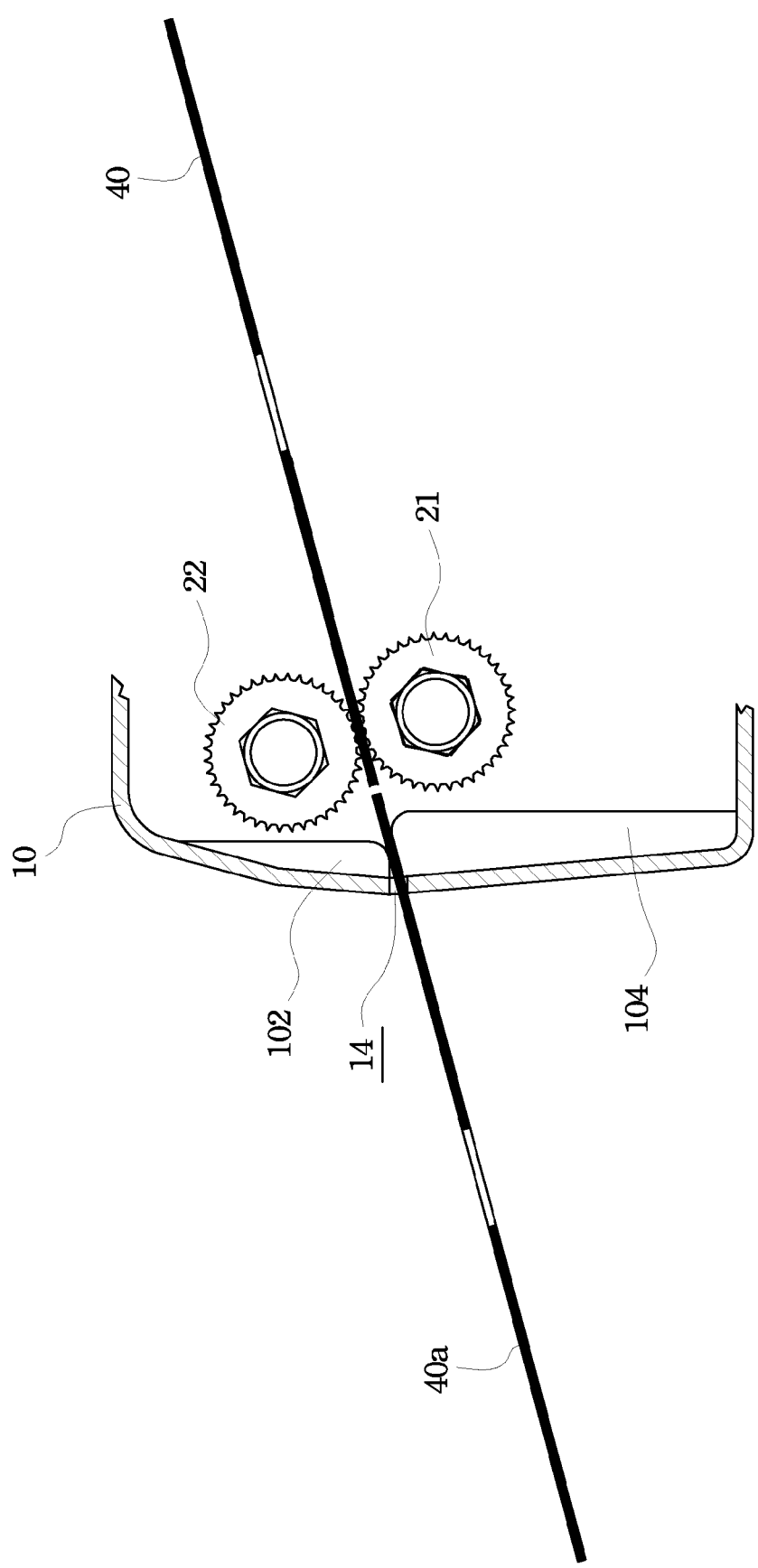
FIG. 5 is an operational, sectional view of the disk destroying apparatus in FIG. 1.
Figure 6:
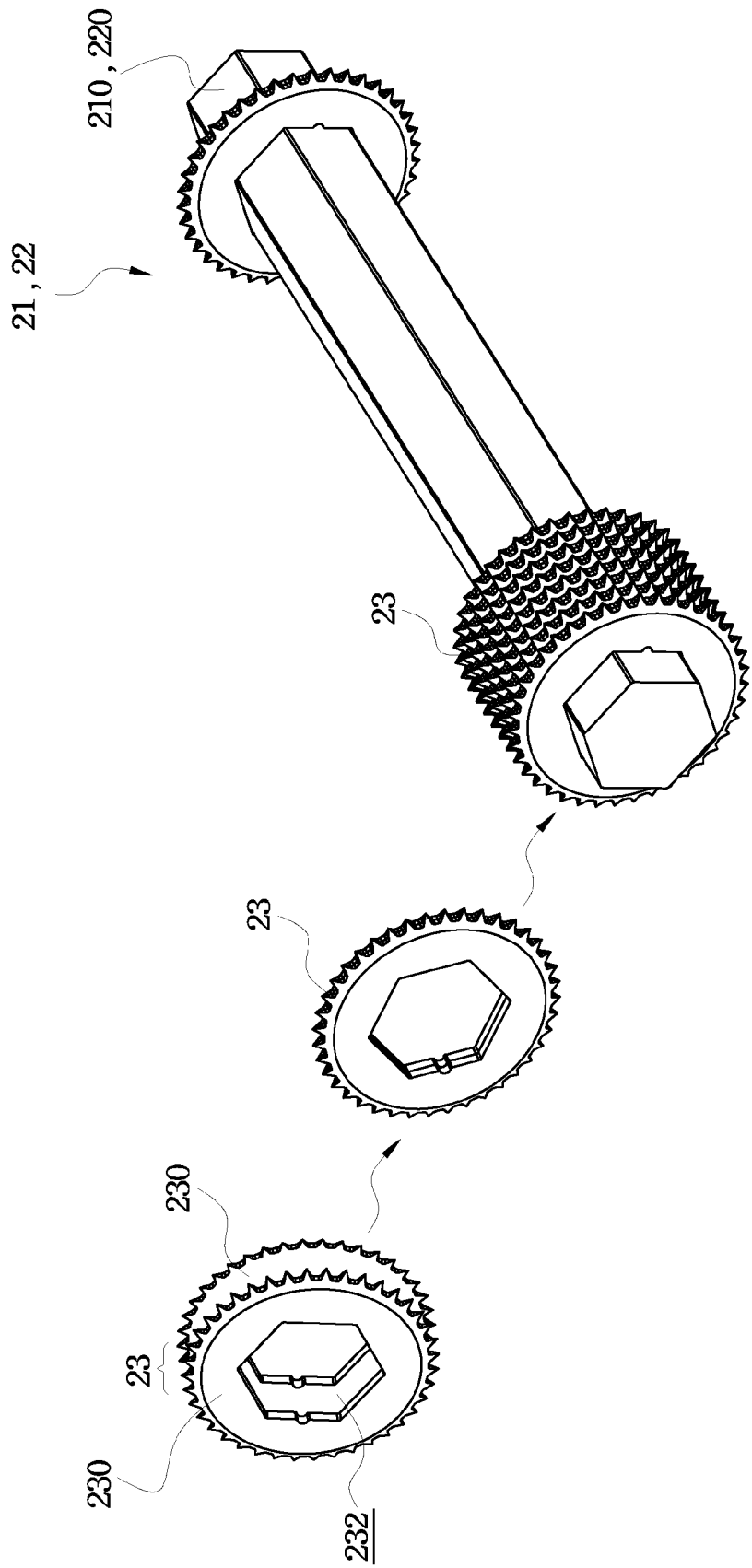
FIG. 6 is an exploded perspective view of a teethed roller of the disk destroying apparatus in FIG. 1.

Refer to FIG. 2, FIG. 5 and FIG. 6. The compact disk feeding apparatus 1 is implemented with a disk destroying apparatus that comprises two teethed rollers 21, 22. The teethed rollers 21, 22 are rotatably mounted in the casing, rotated by the motor 20 and have a gap between them. The slot 124, the gap and the disk outlet 14 are co-planer so as to allow a disk to pass through. Each of the teethed rollers 21, 22 comprises a shaft 210,220 and multiple teethed disks 23. Each of the teethed disks 23 has a body 230, multiple teeth formed at the edge of the body 230 and an axial hole 232. The shaft 210, 220 is a multi-faceted bar and has a hexangular cross-section, for example. The axial hole 232 is a hexangular hole that holds the shaft 210,220. Thus, when the motor 20 is turned on, the motor 20 simultaneously rotates both the feeding roller 24 and the teethed rollers 21, 22, the rotations of the feeding roller 24 move the compact disk at the bottom of the compact disk stack through the slot 124. The disk 40 is continuously moved to pass through the gap between the teethed rollers 21,23. The teethed disks 23 scratch both sides of the disk 40. The destroyed disk 40*a* is eventually passed through the disk outlet 14. Since both sides of the disk 40 hare scratched, a disk drive is unable to read the destroyed disk 40*a*. Therefore, it is safe to throw the disk 40*a* away.

Figure 7:
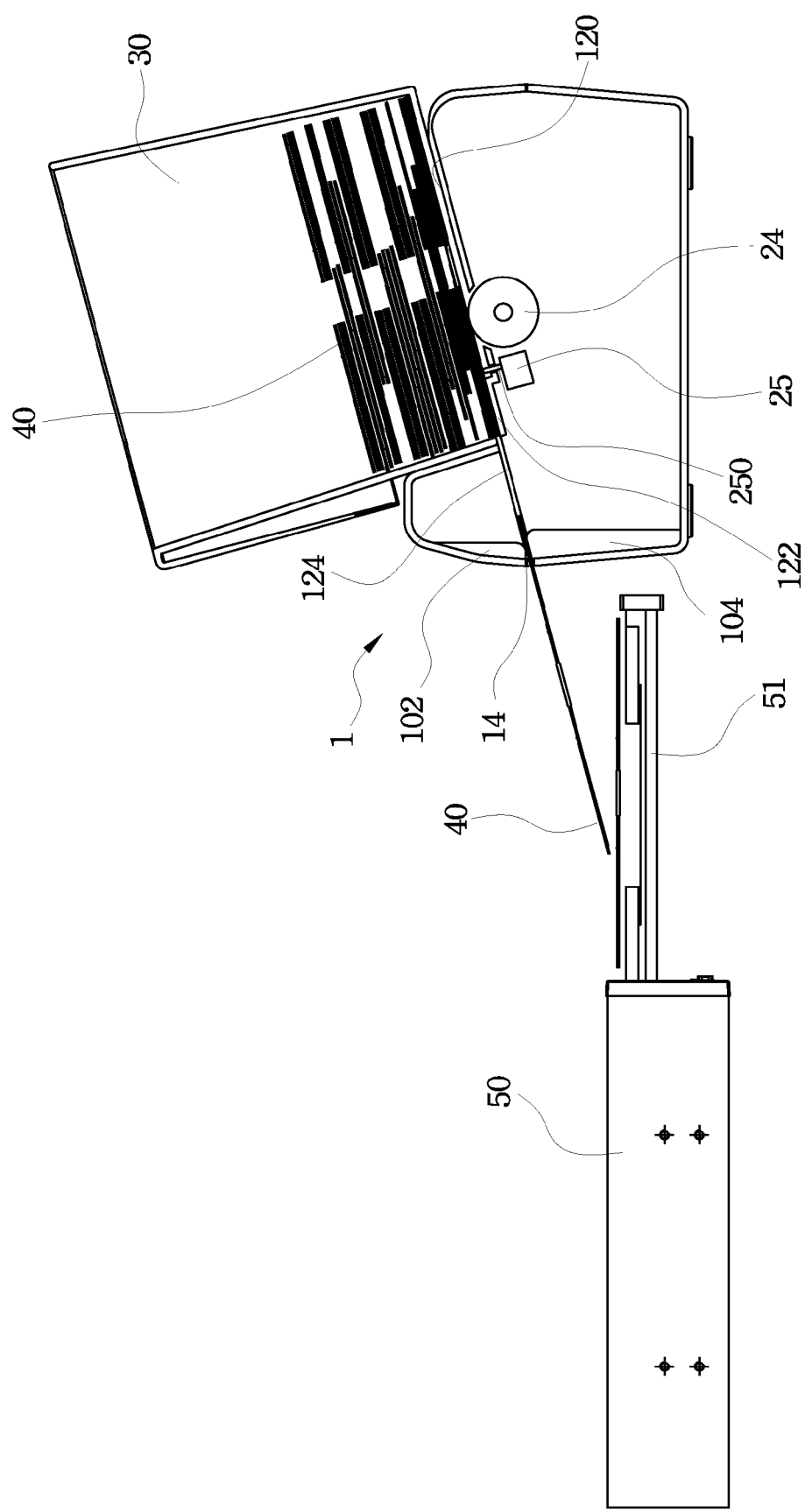
FIG. 7 is a operational, sectional view of another embodiment with automatic compact disk feeding apparatus in accordance with the present invention.

Refer to FIG. 7. The compact disk feeding apparatus 1 is implemented with a disk drive 50 such as a burner. A single disk 40 is fed through the disk outlet 14 of the compact disk feeding apparatus 1 onto a tray 51 of the disk drive 50 to encode data.

The aforementioned applications of the compact disk feeding apparatus are not to limit the present invention and are illustrative purposes only. The compact disk feeding apparatus may be applied to any device that needs automatically feeding a single compact disk at a time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An automatic compact disk feeding apparatus comprising
a base assembly comprising a casing comprising a top recess and a disk outlet, and the top recess comprising an inclined bottom, a slot defined in a bottom edge of the inclined bottom and a platform formed on the inclined bottom, and the platform having a top surface aligned with the slot;
a disk transportation device mounted in the base assembly and comprising a feeding roller rotatably mounted in the casing and partially exposed on the inclined bottom; and
disk holder demountably mounted on the base assembly to hold a compact disk stack, and comprising an opening aligned with the slot when the disk holder is mounted on the casing;
whereby the feeding roller of the disk transportation device moves the compact disk at the bottom of the compact disk stack through the slot and the disk outlet when the feeding roller of the disk transportation device is rotated.

2. The automatic compact disk feeding apparatus as claimed in claim 1, wherein the base assembly further comprises a power switch mounted on the casing.

3. The automatic compact disk feeding apparatus as claimed in claim 2, wherein the disk platform further comprises a semicircular recess where the trigger and the feeding roller are mounted in the semicircular recess on the inclined bottom.

4. The automatic compact disk feeding apparatus as claimed in claim 2, wherein the disk transportation device further comprises
a touching switch mounted in the casing and comprising a trigger extended out of the inclined bottom of the top recess; and
a motor electrically connected to the power switch and rotating the feeding roller.

5. The automatic compact disk feeding apparatus as claimed in claim 1, wherein the base assembly further comprises multiple guide fins mounted inside the casing perpendicular to the disk outlet.

6. The automatic compact disk feeding apparatus as claimed in claim 1, wherein the disk holder further comprises a handle.

7. An apparatus to destroy a compact disk, and the apparatus comprising
a base assembly comprising a casing comprising a top recess and a disk outlet, and the top recess comprising an inclined bottom, a slot defined in a bottom edge of the inclined bottom and a platform formed on the inclined bottom, and the platform having a top surface aligned with the slot;
a disk transportation device mounted in the base assembly and comprising a feeding roller rotatably mounted in the casing and partially exposed on the inclined bottom, and a motor rotating the feeding roller;
a disk holder demountably mounted on the base assembly to hold a compact disk stack, and comprising an opening aligned with the slot when the disk holder is mounted on the casing; and
a disk destroying apparatus comprising two teethed rollers rotatably mounted in the casing, rotated by the motor and having a gap between the teethed rollers, where the slot, the gap and the disk outlet are co-planer;
whereby the feeding roller of the disk transportation device moves the compact disk at the bottom of the compact disk stack through the slot, the gap and the disk outlet when the feeding roller of the disk transportation device is rotated.

8. The apparatus to destroy a compact disk as claimed in claim 7, wherein each teethed roller comprises
a shaft rotatably mounted in the casing; and
multiple teethed disks mounted on the shaft and rotated by the shaft.

9. The apparatus to destroy a compact disk as claimed in claim 8, wherein the shaft is a multi-faceted bar and has a hexangular cross section; and each teethed disk has an axial hole and the axial hole is a hexangular hole that holds the shaft.

10. The apparatus to destroy a compact disk as claimed in claim 7, wherein the disk transportation device further comprises a touching switch mounted in the casing and comprising a trigger extended out of the inclined bottom of the top recess.

11. The apparatus to destroy a compact disk as claimed in claim 10, wherein the disk platform further comprising a semicircular recess where the trigger and the feeding roller are mounted in the semicircular recess on the inclined bottom.

12. The apparatus to destroy a compact disk as claimed in claim 7, wherein the base assembly further comprises a power switch mounted on the casing and electrically connected to the motor.

13. The apparatus to destroy a compact disk as claimed in claim 7, wherein the base assembly further comprises multiple guide fins mounted inside the casing perpendicular to the disk outlet.

14. The apparatus to destroy a compact disk as claimed in claim 7, wherein the disk holder further comprises a handle.

15. A compact disk feeder comprising a base assembly comprising a casing comprising a top recess and the top recess comprising an inclined bottom, a slot defined in a bottom edge of the inclined bottom;

a disk transportation device mounted in the base assembly and comprising a feeding roller rotatably mounted in the casing and partially exposed on the inclined bottom to move a compact disk by its rotation; and a disk holder demountably mounted on the base assembly, wherein the disk holder has an inner space to hold a stack of compact disks, and an opening aligned with the slot when the disk holder is mounted on the casing.

16. The compact disk feeder as claimed in claim 15, wherein the disk transportation device further comprises a touching switch mounted in the casing and comprising a trigger extended out of the inclined bottom of the top recess; and a motor connected to the feeding roller to rotate the feeding roller.

17. The compact disk feeder as claimed in claim 16, wherein the base assembly further comprises a power switch mounted on the casing and electrically connected to the motor.

18. The compact disk feeder as claimed in claim 15, wherein the base assembly further comprises multiple guide fins mounted inside the casing.

19. The compact disk feeder as claimed in claim 15, wherein the disk holder further comprises a handle.

* * * * *